Figure 1:
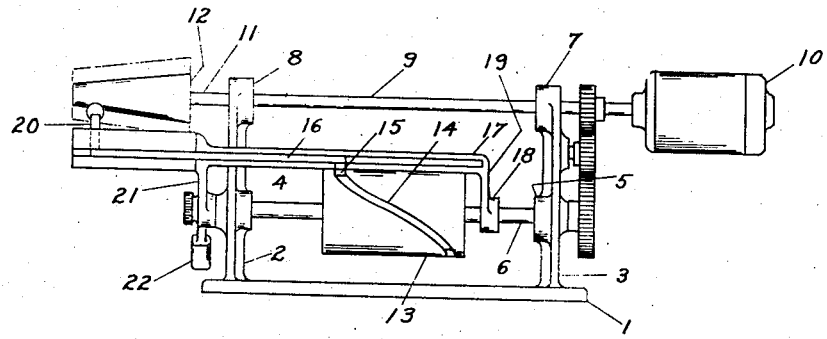

Dec. 20, 1938.    H. A. SATTERLEE    2,140,555
APPARATUS FOR CONTROLLING SPEED OF WINDING MACHINERY
Filed Aug. 31, 1936

INVENTOR.
Howard A. Satterlee
BY
ATTORNEY.

Patented Dec. 20, 1938

2,140,555

UNITED STATES PATENT OFFICE 2,140,555

APPARATUS FOR CONTROLLING SPEED OF WINDING MACHINERY

Howard A. Satterlee, Needham, Mass., assignor to Submarine Signal Company, Boston, Mass., a corporation of Maine Application August 31, 1936, Serial No. 98,645

2 Claims. (Cl. 242—18)

The present invention relates to apparatus for controlling the rotation of shafts or spindles and in particular to controlling the same in accordance with some predetermined factor.

In many types of machines where rotating spindles are used, it is highly desirable to control the speed of rotation depending upon the use for which it is put. In machines where a wire or thread is wound upon a spool it has been customary in the past to run the spindle or shaft at its highest allowable speed. In many cases this means that the speed of winding at the beginning of the winding of the spool or coil is slower than that which could be employed. This follows from the fact that if the linear speed of winding when the roll becomes large is limited to a given value, then the speed at the beginning of the winding must be that much less to allow for the change in diameter of the spool as the thread is gradually applied.

The winding speed in winding coils or spools is particularly critical in the case of thin threads as in the winding of cotton, rayon or silk. Ordinarily in these cases the maximum permissible linear velocity of the thread is determined and the winding speed is set at such a value that when the spool has been completely wound, this speed will be obtained. If this were not the condition, considerable difficulty would be encountered on account of the breaking of the threads and it would be impossible to complete a spool winding.

In many of these cases the initial diameter of the spool is about 1½ inches and the final diameter about 5 inches so that the change in linear velocity of the thread with a constant rotational velocity is about of the ratio of three to one.

On account of these facts attempts have been made to gradually vary the rotational velocity so as to preserve a constant linear velocity of the thread throughout the whole winding period. Mechanical means have been employed to accomplish this purpose but apparently without success.

The chief difficulty in obtaining sufficient control in mechanical methods is that usually considerable power is necessary to operate the controls and since the threads are usually weak, and not strong, they can not stand the forces that are applied to effect the proper controls. Further than this, no device has been developed so far as the applicant knows by which a uniform variation in speed is obtained in such a manner that it would be applicable to control the speed variation necessary in order to maintain the linear winding speed constant in the case of spool winding as described above.

The present invention overcomes all of these difficulties and provides a device in which the linear speed of winding may be maintained constant or even varied in accordance with a predetermined condition or in accordance with conditions which exist as the winding is being done. Such control is obtained through the combination of a mechanical and electrical means, the mechanical means serving to control an electrical element which, in turn, controls the driving motor driving the spindle.

In the present invention the control is obtained directly from the element carrying the thread which is positioned so as to bear lightly against the spool as it is wound. As this element is gradually pushed outwards, the electrical circuit is controlled to decrease the motor speed in a manner to maintain constant linear speed of the thread itself.

The invention is described below particularly in connection with winding spools of thread, but it may be used in any type of winding machine where it is desired to vary the winding speed of the motor and it is particularly useful in such cases where the winding element is of such a mechanical nature that it can not be subject to a great deal of strains in the winding.

Figure 2:
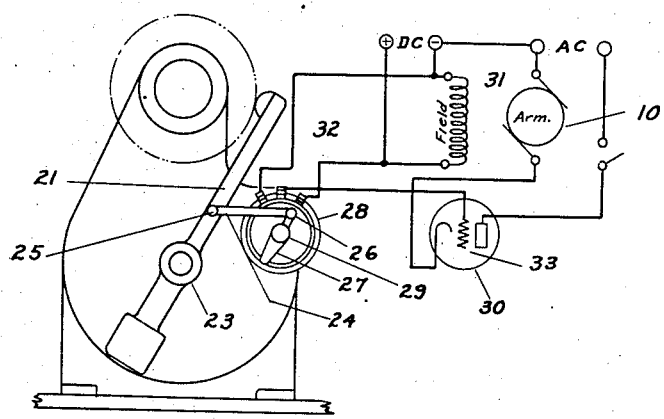

The invention will be more fully described in connection with the embodiment shown below in which Fig. 1 shows a front elevation of the winding machine illustrating particularly the present invention, and Fig. 2 shows a side elevation with the electrical circuit diagrammatically illustrated.

In Fig. 1, I indicates a base from which there extend upright supports 2 and 3 containing bearings 4 and 5 in which the shaft 6 is free to rotate. A further set of bearings 7 and 8 is provided for the shaft 9 which is driven by the motor 10 and which drives the mandrel 11 on which the spool form 12 is positioned. The shaft 6 supports a cam 13 which has a groove 14 in which the bar 15 projecting from the end of the rod 16 works. The rod 16 is supported in a frame 17 which at the right-hand end is pivoted on the shaft 6 by means of the collar 18 to which the frame 17 is attached by means of the arm 19. The frame 17 acts as a guide for the rod 16 which reciprocates back and forth as the arm 15 follows in the groove 14.

At the end of the rod 16 is a vertically upwardly extending bar 20 over which the thread for winding on the form is attached. The frame 17 is also pivoted in line with the collar 18 externally of the support 2 by means of the arm 21 which may be weighted at the end as indicated by 22 to furnish the proper pressure of the bar or arm 20 against the spindle 12.

Attached to the supporting arm 21 pivoted externally of the support 2 at 23, as indicated more clearly in Fig. 2, is a link 24 which is pinned at 25 to the arm 21 and at 26 to the arm 27 of a potentiometer 28, which arm 27 is as in the usual manner pivoted within the potentiometer as indicated at 29. The motor control is the same as that indicated in my companion application Serial No. 108,853, filed November 2, 1936, in which the operation of the motor speed control is fully set forth. Particular attention is called to Figures 6 and 12 of this companion application which corresponds in circuit arrangement to the arrangement set forth in Fig. 2 of the present application. As the position of the arm 27 of the potentiometer is varied, the speed of the system is controlled through the operation of the gaseous control tube 30 in Fig. 2.

In the arrangement shown the motor 10 is a direct current machine supplied from an alternating current source A. C. in series with the three-electrode gaseous tube 30. The field of the motor is supplied from a direct current source D. C. as is also the potentiometer 28. The adjustable connection 32 of the potentiometer connected to the arm 27 is connected to the grid 33 of the gaseous tube 30. In the operation of this system, as explained in my companion application, at two points in each alternating current cycle the potential across the cathode anode of the gaseous tube is zero and that subsequent to these times the tube may become non-conductive depending upon the relative potential of the grid 33. If the tube should become non-conductive, it is because the back E. M. F. of the armature 10 is such as to reduce the potential applied by the potentiometer arm 27 to such a point that the conduction of the tube is not sustained. When this happens, the motor is going too fast and therefore the current is broken by the tube becoming non-conductive and remains such until the speed of the motor is reduced to the desired value.

The position of the arm 27 of the potentiometer, however, is controlled by the position of the arm 21 which, in turn, is controlled by amount of thread on the spindle form 12. If the arm is in the position as indicated in Fig. 2, then the potentiometer arm 27 has moved to such a position that the positive potential applied to the grid of the tube is small and only a small back E. M. F. is enough to overcome this and put the tube out or make it non-conductive. Under this condition, therefore, the normal speed of the motor is reduced from its former value. In this way, therefore, for each position of the potentiometer arm 27 a definite speed is established and as the arm 27 is gradually rotated as the spool winds, pushing the lever 21 backwards, so the speed of the motor is decreased.

Having now described my invention, I claim:

1. In a thread-winding machine having a winding spindle, a spool mounted thereon, a motor for driving the spindle and a speed control circuit for the motor including a potentiometer having a movable contact, the combination of a lever having a large mass at one end, means rotatably mounting the lever at a point nearer the weighted end, means at the other end of the lever adapted to bear against the thread on the spool, a link rotatably connected by one end to said lever near the mounting point of the latter, the other end of said link being connected to the movable contact of said potentiometer.

2. In a thread-winding machine having a spindle, a spool mounted thereon, a motor for driving the spindle and a speed control circuit for the motor, the combination of a potentiometer forming part of said circuit, said potentiometer having a resistance wire wound on a circular form and a wire-engaging contact arm pivoted on an axis concentric with said form and having an extension opposite the contact portion of the arm, a lever pivoted on the frame of the machine and having a short weighted arm and light weight long arm, means at the end of the long arm adapted to bear against the thread being wound on the spool and a link pivoted by one end to said lever near its pivot and by the other end to said extension on said potentiometer arm.

HOWARD A. SATTERLEE.